(12) United States Patent
Claudel et al.

(10) Patent No.: US 9,492,878 B2
(45) Date of Patent: Nov. 15, 2016

(54) TOOLSET AND METHOD FOR PRODUCING A METAL LINER

(75) Inventors: Sylvain Claudel, Saint-Medard-en-Jalles (FR); Dominique Lacour, Tresse (FR)

(73) Assignee: AIRBUS DEFENCE AND SPACE SAS (FR)

(*) Notice: Subject to any disclaimer, the term of this patent is extended or adjusted under 35 U.S.C. 154(b) by 531 days.

(21) Appl. No.: 13/882,623

(22) PCT Filed: Nov. 21, 2011

(86) PCT No.: PCT/EP2011/070529
§ 371 (c)(1),
(2), (4) Date: Jun. 14, 2013

(87) PCT Pub. No.: WO2012/069399
PCT Pub. Date: May 31, 2012

(65) Prior Publication Data
US 2014/0144887 A1 May 29, 2014

(30) Foreign Application Priority Data
Nov. 22, 2010 (FR) .................... 10 59605

(51) Int. Cl.
| B23K 9/16 | (2006.01) |
|---|---|
| B23K 9/00 | (2006.01) |
| F17C 1/06 | (2006.01) |

(52) U.S. Cl.
CPC .............. *B23K 9/0026* (2013.01); *F17C 1/06* (2013.01); *F17C 2201/0109* (2013.01); *F17C 2201/054* (2013.01); *F17C 2201/056* (2013.01); *F17C 2203/0604* (2013.01); *F17C 2203/066* (2013.01); *F17C 2203/0619* (2013.01); *F17C 2203/0636* (2013.01); *F17C 2203/0646* (2013.01); *F17C 2203/0648* (2013.01); *F17C 2203/0663* (2013.01); *F17C 2203/0673* (2013.01); *F17C 2209/2163* (2013.01); *F17C 2209/221* (2013.01); *F17C 2209/224* (2013.01); *F17C 2223/0161* (2013.01); *F17C 2260/012* (2013.01); *F17C 2270/0194* (2013.01); *Y10T 29/53* (2015.01)

(58) Field of Classification Search
CPC .................................................. B23K 9/0026
USPC ........ 219/600, 635, 643, 644; 220/581, 586, 220/588, 589, 590, 591; 29/700
See application file for complete search history.

(56) References Cited

U.S. PATENT DOCUMENTS

| 3,321,347 | A | | 5/1967 | Price et al. | |
|---|---|---|---|---|---|
| 3,508,677 | A | * | 4/1970 | Laibson | B29C 65/00 220/590 |
| 5,803,151 | A | * | 9/1998 | Carden | B22C 1/00 164/132 |
| 5,822,838 | A | * | 10/1998 | Seal | B21D 51/24 156/172 |
| 8,449,705 | B1 | * | 5/2013 | Rufer | B29C 53/587 156/155 |
| 2002/0155232 | A1 | * | 10/2002 | DeLay | 428/34.1 |
| 2004/0026431 | A1 | * | 2/2004 | Jones | 220/588 |
| 2004/0118855 | A1 | | 6/2004 | Calabro | |
| 2007/0205201 | A1 | | 9/2007 | Cundiff et al. | |

OTHER PUBLICATIONS

International Search Report Dated May 4, 2012.

* cited by examiner

*Primary Examiner* — Dana Ross
*Assistant Examiner* — Joseph Iskra
(74) *Attorney, Agent, or Firm* — Perman & Green, LLP

(57) ABSTRACT

A method and a toolset for manufacturing a metal liner for a composite vessel includes a mandrel configured in several mandrel elements forming support elements of primary parts constituting the metal liner.

22 Claims, 4 Drawing Sheets

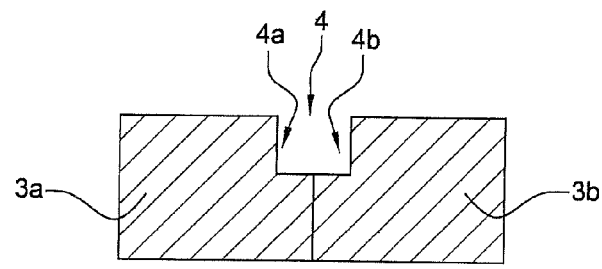
Fig. 5
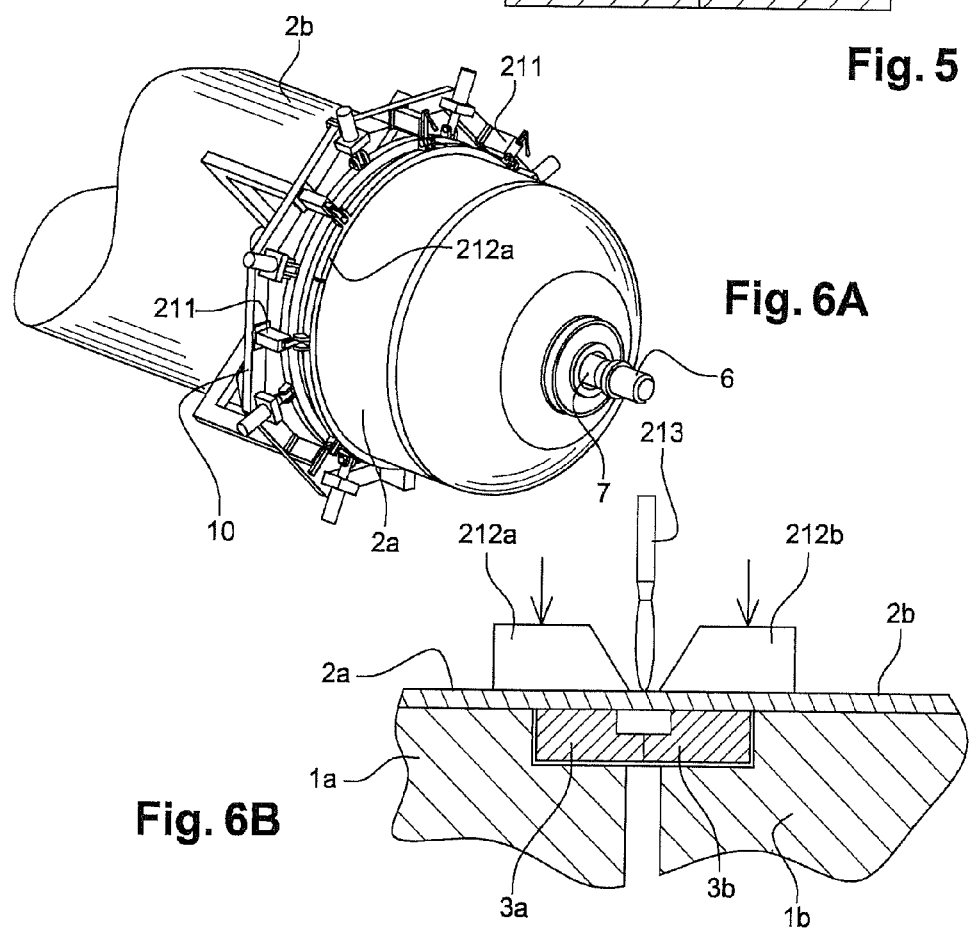
Fig. 6A
Fig. 6B
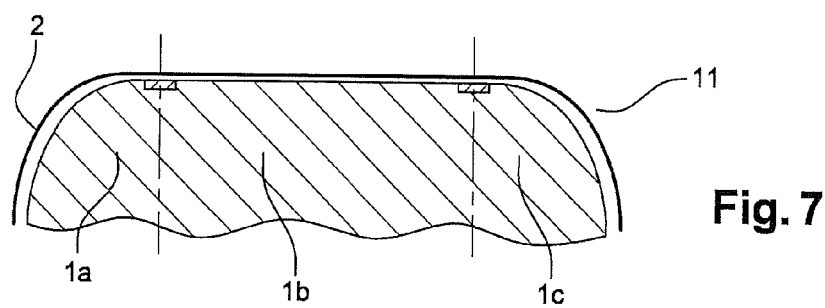
Fig. 7

TOOLSET AND METHOD FOR PRODUCING A METAL LINER

CROSS-REFERENCE TO RELATED APPLICATIONS

This application is the National Stage of International Application No. PCT/EP2011/070529 International Filing date, 21 Nov. 2011, which designated the United States of America, and which International Application was published under PCT Article 21 (s) as WO Publication 2012/069399 A1 and which claims priority from, and benefit of, French Application No. 1059605 filed on 22 Nov. 2010, the disclosures of which are incorporated herein by reference in their entireties.

The disclosed embodiment concerns the production of metal liners and objects comprising such a liner.

Metal liners are used in particular in the field of wrapped composite vessels.

BACKGROUND

In the case of high-performance vessels, such as those intended for storing fluids under pressure, in particular for space applications, or for storing cryogenic fluids under pressure, the metal liners are thin in comparison to the vessel's volume.

'High-performance vessels' means vessels optimized in terms of mass, such as those used in transportation industries in general, space transportation in particular.

High-performance composite vessels intended for storing pressurized fluids are generally designed by separating the functions of hermeticity and mechanical resilience to pressure.

Containment of the fluid, hermeticity and/or protection of the wall made of composite material with regard to the fluid is provided by a shell made of metal or polymer, generally thin, called the "liner"; and resistance to the pressure of the fluid contained in the vessel is provided by a winding of composite fibers coated with resin.

The composite fibers (fibers and resin) are deposited on the liner by filament winding.

This technology is known and Lockheed Martin's patent U.S. Pat. No. 6,401,963 can be cited as an example.

The shell is thin since it has no mechanical function and the goal sought is to minimize the vessel's mass.

In addition to its hermeticity function, the liner also has the function of withstanding the forces induced by depositing the carbon fibers, during which the liner functions as a mandrel for the winding, and provides the reference surface for the composite structure deposited.

This secondary winding support function performed by the liner gives rise to a need for the mechanical resilience and/or stiffness of the liner.

This requires the liner to be sufficiently thick, depending on the properties of the material and geometry of the part.

The winding forces appear as a local compression on the liner of approximately 0.3 MPa and consequently appear as increased mass of the finished vessel.

This can be a particular problem for large-sized vessels, several meters in size, where the liner's mass becomes significant, or when the material of the liner is ductile and/or has a low elastic limit and/or low mechanical resilience; this is the case, for example, for a liner made of high-purity aluminum, or in general when, to reduce the liner's mass significantly, thicknesses of less than 1 mm are reached for vessels with dimensions in meters.

The liner's resistance is also an important parameter in the case where the fibers are placed by contact winding or fiber placement.

In effect, these methods apply a force directly onto the support at the point where the fibers are deposited, whereas in winding this force results from the tension to which the thread is subjected.

In the case where the liner is not able to withstand the thread deposition forces, or when a hermetic liner is not needed, a mandrel is used.

There are many mandrel technologies, and metal mandrels and mandrels made of a soluble material (e.g. sand plus polyvinyl alcohol soluble in water) can be cited.

A general problem is removing the mandrel after winding and producing the composite material because, in general, the mandrel is only accessible through the vessel's future filling port.

SUMMARY

The disclosed embodiment relates to a new toolset and a new method of manufacturing a very thin and very accurate metal liner for high-performance composite vessels that may be large.

The aim of the disclosed embodiment is, in particular, to be able to use materials with very low mechanical resilience, whether because of their intrinsic properties, as in the case of a pure aluminum of type 1050, or simply because the liner is very thin.

The toolset designed for this method comprises a soluble mandrel as support for the metal liner, wherein the role of the soluble mandrel is to:

perform the function of support for the metal liner perform the function of mechanical support for the subsequent winding, in both mechanical and geometrical terms perform the function of toolset for manufacturing the metal liner.

More specifically, the disclosed embodiment envisages a toolset for manufacturing a metal liner, in particular for a composite vessel, that comprises a mandrel configured in several mandrel elements forming support elements of primary parts constituting the metal liner.

According to a particular embodiment of the disclosed embodiment, the liner may be a cylindrical vessel liner with rounded ends, and the support elements comprise at least one front body, one rear body and at least one intermediate cylindrical body.

The toolset advantageously comprises annular sectors designed to be positioned on the junction ends of said front body, rear body and intermediate cylindrical body, these sectors reinforcing the mandrel's elements at their junctions.

According to a particular aspect of the disclosed embodiment, said annular sectors are sectors made of steel.

The annular sectors advantageously comprise a peripheral annular setback designed to form an annular channel with the peripheral annular setback of an adjacent sector.

The annular sectors are preferably removable sectors.

According to an aspect of the disclosed embodiment, the mandrel's elements are parts made of a soluble material.

The parts made of a soluble material are preferably wrapped in a sealant skin.

According to another aspect of the disclosed embodiment, at least some of the mandrel elements are revolving parts mounted on a bearing axle of the mandrel.

Alternatively, at least some of the mandrel elements are mounted on receiving tubes of a bearing axle of the mandrel.

The disclosed embodiment also concerns a method for producing an object comprising a liner, such as a composite vessel, which comprises a step of placing portions of a liner on mandrel elements, a step of assembling elements of the mandrel bearing the portions of the liner and a step of welding portions of the liner onto the assembled mandrel elements.

According to an aspect of the disclosed embodiment applicable in particular to wrapped composite vessels, the method comprises a step of winding fibers on the liner completed on the mandrel.

According to another aspect of the disclosed embodiment, the step of assembling elements of the mandrel is realized on a rotating drive axle of the mandrel.

In the case where the mandrel is a soluble mandrel, the method advantageously comprises a step of reabsorbing the mandrel after either the winding step or the welding step.

The method advantageously comprises a step of positioning annular sectors on the junction ends of the mandrel elements before the step of placing liner portions on the mandrel elements.

The step of welding portions of the liner assembled on the elements of the mandrel is preferably realized by welding edges facing portions of the liner above channels at the annular sectors.

The step of placing portions of the liner advantageously comprises a step of heating liner portions, a step of positioning liner portions on the mandrel elements and a step of cooling liner portions producing a shrink-fitting of liner portions on the mandrel elements.

In the method applied to the production of a composite vessel with a metal liner, the mandrel elements are shaped into a front body, a rear body and at least one intermediate cylindrical body.

BRIEF DESCRIPTION OF THE DRAWINGS

Other features and advantages of the disclosed embodiment will become apparent in reading the following description of a non-limiting example of the disclosed embodiment with reference to the drawings, which show:

in FIG. 5: a detail of realization of sectors according to an embodiment of the disclosed embodiment;

in FIG. 6A: a detail of an operation of welding a liner onto a toolset according to the disclosed embodiment;

in FIG. 6B: a front cross-section detail of a welding operation using the toolset of FIG. 6A;

in FIG. 7: a cross-section diagram of a liner portion on a mandrel according to the disclosed embodiment;

DETAILED DESCRIPTION

Figure 1:
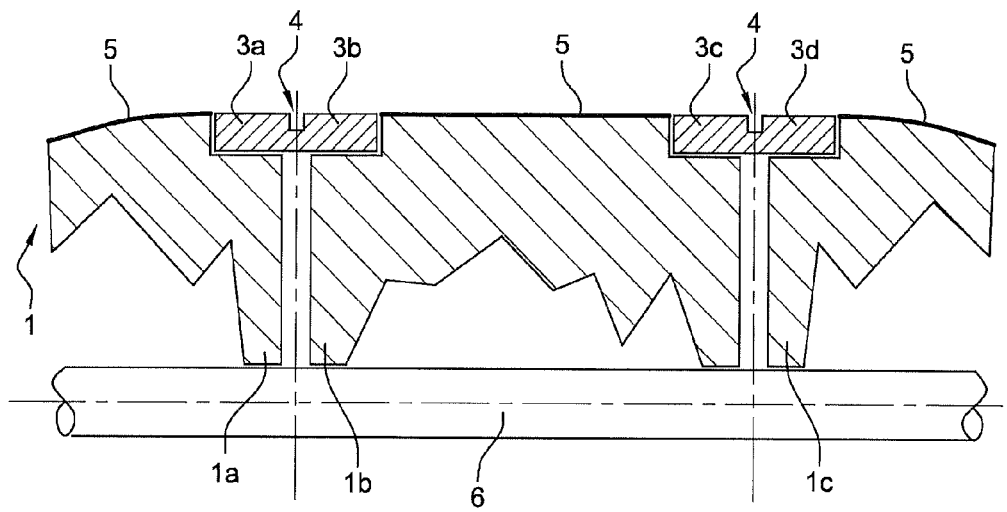
in FIG. 1: a longitudinal cross-section view of a first example of realization of a portion of a toolset according to the disclosed embodiment.

FIG. 1 shows a toolset for manufacturing a metal liner, in particular for a composite vessel.

This toolset comprises a mandrel 1 configured in several mandrel elements forming support elements of primary parts constituting the metal liner.

In an application such as the production of a cylindrical vessel liner with rounded ends, the support elements comprise at least one front body 1a, one rear body 1c and at least one intermediate cylindrical body 1b.

These mandrel elements are advantageously parts made of a soluble material, which can thus be easily removed once that liner has been realized.

To provide a high-quality surface for placing liner portions, the parts made of a soluble material are, according to the example, wrapped in a sealant skin 5.

Still according to FIG. 1, the toolset comprises annular sectors 3a, 3b, 3c, 3d designed to be positioned on the junction ends of said front body, rear body and intermediate cylindrical body.

Said annular sectors 3a, 3b, 3c, 3d are sectors made of steel, e.g. an austenitic stainless steel.

As shown more particularly in FIG. 5, the annular sectors comprise a peripheral annular setback 4a designed to form an annular channel 4 with the peripheral annular setback 4b of an adjacent sector.

As will be seen later, these annular channels are useful for producing a clearance area for an operation welding liner portions to each other.

The annular sectors 3a, 3b, 3c, 3d are removable sectors.

Back in FIG. 1, at least some of the mandrel elements are revolving parts mounted on a bearing axle 6 of the mandrel.

Figure 2:
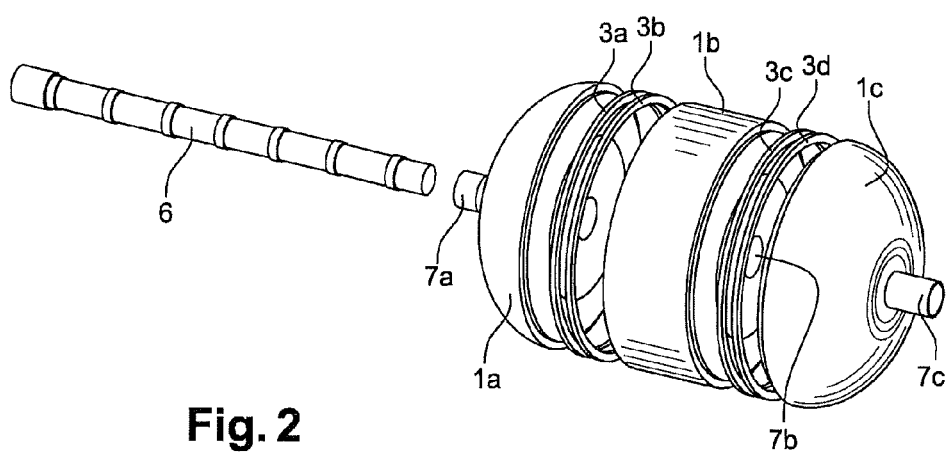
in FIG. 2: an exploded perspective view of a second example of realization of a portion of a toolset according to the disclosed embodiment.

According to the example of FIG. 2, the mandrel elements are mounted on receiving tubes 7a, 7b, 7c of a bearing axle 6 of the mandrel.

Mounting mandrel elements on the tubes 7a, 7b 7c facilitates their handling and prevents them from being damaged when they are mounted on the axle 6.

FIG. 2 also shows sectors 3a to 3d, which fit together on the ends opposite the front body, rear body and intermediate body.

According to this figure, the sectors are positioned when the mandrel is mounted on the axle 6 but it is preferable to position each of them on its mandrel element before placing the liner portions.

According to the method of the disclosed embodiment, the various primary parts constituting the liner (front dome, rear dome and collar) are produced separately and then they are assembled on the soluble mandrel, precisely machined beforehand.

After machining or forming, the primary parts forming the liner portions are expanded by heating, butted up to the corresponding parts of the mandrel and then shrink-fitted into position by simple contraction as they cool.

Figure 3A:
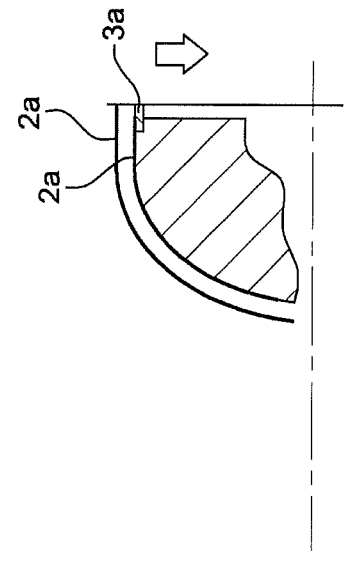
in FIGS. 3A, 3B and 4A, 4B: an example of realization of a step of placing liner portions on mandrel elements of the disclosed embodiment.
Figure 3B:
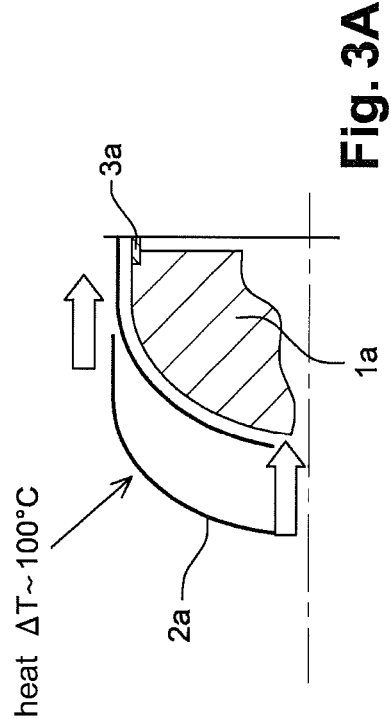

FIGS. 3A and 3B provide an example of placing a liner portion forming a liner's front or rear dome 2a on the corresponding mandrel element 1a.

According to FIG. 3A, the dome-shaped liner portion is heated to approximately 100° C. for an aluminum element, such that this element expands, and is then positioned on the corresponding mandrel element.

According to FIG. 3B, the liner portion 2a cools and adopts the shape of the mandrel element.

It is not necessary to obtain a very large expansion; an expansion such that the liner portion engages without rubbing on the mandrel element is sufficient.

To ensure the liner portion adheres properly to its mandrel element it is desirable to produce the mandrel with an external dimension slightly greater than the inner dimension of the liner portion, which ensures the liner portion being shrink-fitted on the mandrel element.

Figure 4A:
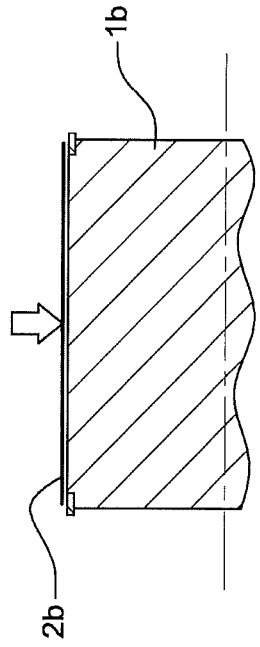
Figure 4B:
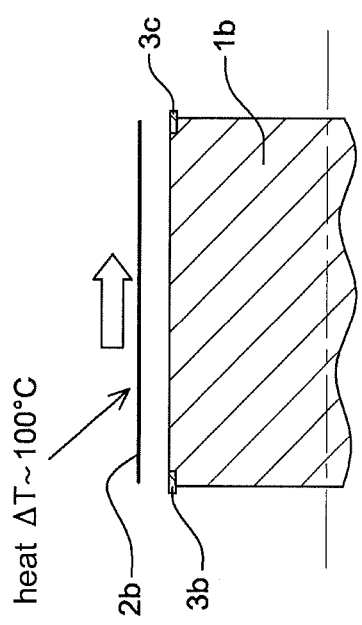

FIGS. 4A and 4B show the placing of a collar element of the liner on an intermediate cylindrical element of the mandrel.

As in the case of the domes, heating the liner portion 2b allows its positioning according to FIG. 4A and the cooling of this liner portion allows it to be shrink-fitted on the cylindrical body 1b.

In these examples, sectors 3a, 3b, 3c have previously been mounted on the mandrel elements and the ends of the liner portions abut these sectors.

In the case of a vessel for which composite fibers are wound on the liner, the geometry of the winding surface is provided by pre-forming the primary parts constituting the liner on the mandrel during shrink-fitting, which confers a high level of precision to the product obtained, for example a cryogenic vessel.

The liner is closed by welding the sub-assemblies on the soluble mandrel. To achieve this, as seen above, the mandrel is equipped with removable sectors allowing the welding area to be protected and cleared locally.

FIG. 6A provides an example of welding tools that can be used.

The toolset comprises a rigid frame 10 on which is fixed a plurality of actuators 211 that press strongly on the external sectors 212a, 212b positioned on the liner elements 2a, 2b as shown in FIG. 6B.

These external sectors and the inner sectors 3a, 3b make it possible to precisely position liner elements to be welded, before and after the welding.

The welding uses, for example, TIG technology and either the welding head 213 is moved over the entire area to be welded or the head is fixed and the object is rotated.

If necessary, the actuators are raised for the passage of the welding head.

The winding 11 operation can then be carried out with the completed liner in position on the mandrel as illustrated in FIG. 7.

Once this winding operation is finished, the mandrel and the sectors are removed from the structure.

The mandrel is removed by melting or dissolving the material in the case of a soluble mandrel and, to remove the sectors, the sectors are deformed if they are made of a spring material and they are removed through the open end of one of the domes.

The toolset makes the use as a liner made of a metallic material with a low elastic limit possible, which is justified where the goal is to optimize the liner's tolerance with regard to fracture mechanics.

In another example of application made possible by the toolset according to the disclosed embodiment, the use as a liner of a material that is very ductile and/or has a low elastic limit in a composite vessel has the advantage that the liner follows the deformations imposed by the composite structure without difficulty.

This is the case in particular for a cryogenic application, with a liner made of 1050 aluminum alloy.

With the method of the disclosed embodiment, it is not necessary to over-size some areas of the liner for depositing the composite winding because of the presence of the mandrel, which withstands the compaction forces.

In all cases, the mandrel according to the disclosed embodiment makes it possible to overcome an inherently insufficient mechanical resilience of a thinned-down liner, which is not suited to withstanding the forces induced during the manufacture of the vessel by itself.

In the state of the art, the liner's external geometry must be realized very accurately in order to ensure the quality of the composite's deposition surface. In addition, in the case where the primary parts constituting the liner must be assembled by welding, the liner's geometry must also be realized with great accuracy to ensure that the fitting tolerances required by the winding method are respected.

These accuracy requirements increase the cost of the liner and become more critical as the thickness of the liner decreases and its dimensions increase.

The liner produced by means of the method and toolset according to the disclosed embodiment allows the shape tolerance to be increased on the primary parts since the mandrel ensures that the deposition surface is respected.

The method and toolset of the disclosed embodiment also allow the use of a more powerful welding method that requires less stringent fitting tolerances because the structure's deformations during welding are reduced by the presence of an internal support formed by the mandrel and by the sectors positioned at the welding area.

This results in cost savings for the liner's manufacturing method.

The example of application of the disclosed embodiment relates to the production of a 1600 mm-diameter liner made of pure aluminum.

The liner's thickness in the collar portion is 1 mm.

The liner is produced in 3 sections, assembled by welding, preferably TIG.

Figure 8:
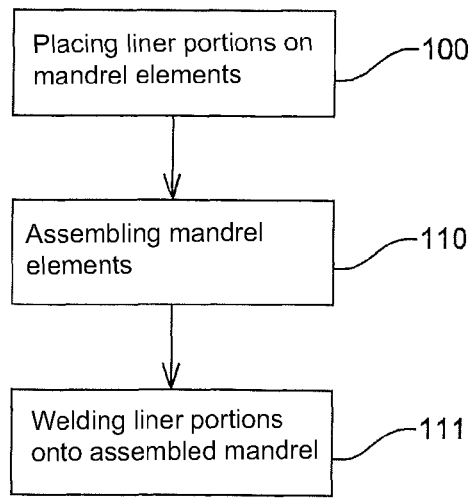
in FIG. 8: a diagram of the main steps of a method according to the disclosed embodiment.

The mandrel made of an Arenyl (Sand and polyvinyl alcohol) type of soluble material is equipped with sectors designed for realizing circumferential welds:

The general method shown in FIG. 8 comprises a step 100 of placing portions 2a, 2b, 2c of a liner on mandrel elements forming a front body 1a, rear body 1c and at least one intermediate cylindrical body 1b, a step 110 of assembling elements of the mandrel bearing the portions of the liner and a step 111 of welding portions of the liner assembled on the elements of the mandrel.

Figure 9:
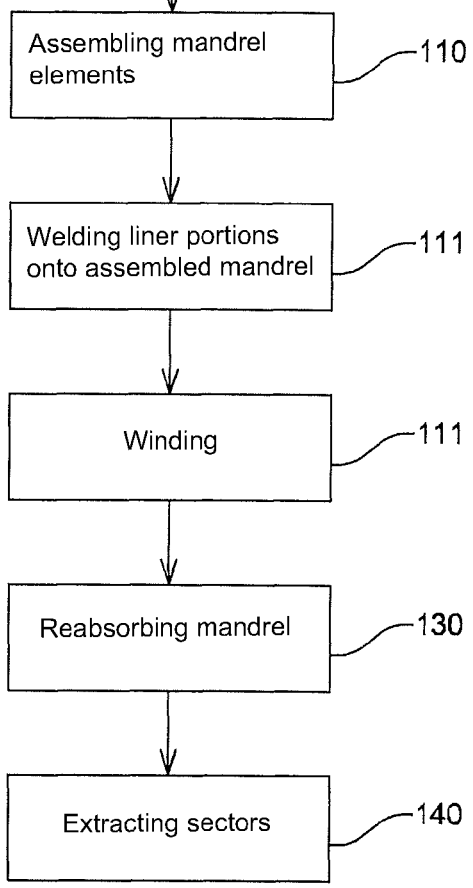
in FIG. 9: a diagram detailing the steps of a method according to an embodiment of the disclosed embodiment.

According to FIG. 9, the general method comprises, in addition, a step 120 of winding fibers 8 on the liner assembled on the elements of the mandrel and the step 110 of assembling elements of the mandrel is realized on a rotating drive axle of the mandrel.

The winding step 120 is carried out in a known way by a winding of composite fibers impregnated with resin and, in the case where the mandrel is a soluble mandrel, the method comprises after the winding step a step 130 of reabsorbing the mandrel, which precedes a step 140 of extracting metal sectors.

The elements of the mandrel comprising a front body, rear body and at least one intermediate cylindrical body, the method comprises a step 90 of positioning annular sectors 3a, 3b, 3c, 3d on the junction ends of said front body, rear body and at least one intermediate cylindrical body before the step 100 of placing liner portions on the mandrel elements.

Step 111 of welding portions of the liner assembled on the elements of the mandrel is then carried out by welding edges facing portions of the liner above channels 4 at the annular sectors.

Figure 10:
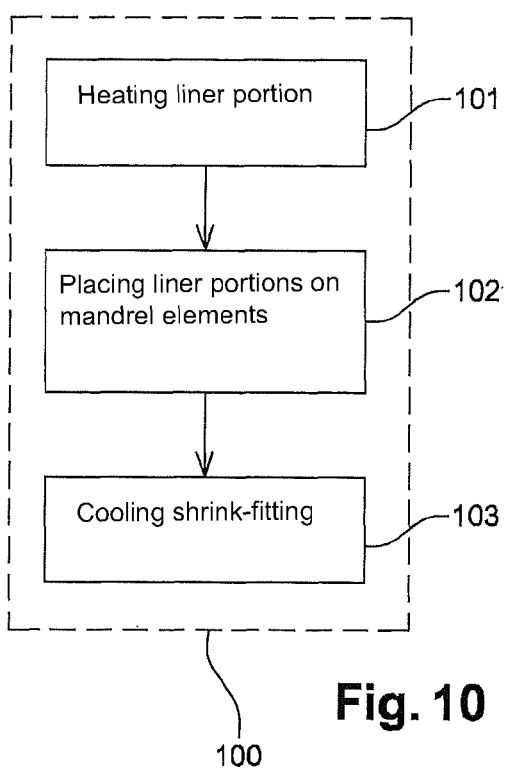
in FIG. 10: a diagram detailing a step of placing liner portions according to a particular embodiment of the disclosed embodiment

According to FIG. 10, step 100 of placing liner portions comprises a step 101 of heating liner portions, a step 102 of positioning liner portions on the mandrel elements and a step 103 of cooling liner portions producing a shrink-fitting of the liner portions on the mandrel elements.

In summary, according to a particular embodiment of the disclosed embodiment, the method begins by butting up primary parts on the mandrel, for example in the following sequence:

1—Butting up liner portions forming a front body and a rear body of the liner on the front and rear bodies of the mandrel, 2—Shrink-fitting liner portions on the corresponding mandrel elements and machining the couplings 1—Butting up the liner's collar onto the intermediate cylindrical body 2—Shrink-fitting the collar on the intermediate cylindrical body and machining the couplings.

The following steps are assembling mandrel elements together to form the complete mandrel then welding the liner portions together.

The welding lines are checked with the mandrel present, then the winding 11 of the composite's material is performed by making the mandrel turn on its axle 6, as illustrated in FIG. 7.

Finally, the mandrel is removed.

The disclosed embodiment can clearly be applied to producing liners for metal or composite vessels. It can also be applied more generally to the production of thin wound or metal parts, such as tubes.

The invention claimed is:

1. Toolset for manufacturing a metal liner for a composite vessel, comprising:
a mandrel configured in several mandrel elements forming support elements of primary parts constituting the metal liner, wherein, the metal liner comprises a vessel liner with rounded ends, and the support elements comprise a front body and a rear body to receive respectively a first rounded metal liner end and a second rounded metal liner end; and
annular sectors designed to be positioned on junction ends of said front body and rear body to support junction ends of said first rounded metal liner end and said second rounded metal liner end, wherein the mandrel elements are parts made of a soluble material.

2. Toolset according to claim 1, wherein said annular sectors are sectors made of steel.

3. Toolset according to claim 1, wherein the annular sectors comprise a peripheral annular setback designed to form an annular channel with a peripheral annular setback of an adjacent sector.

4. Toolset according to claim 1, wherein the annular sectors are removable sectors.

5. Toolset according to claim 1, wherein the parts made of a soluble material are wrapped in a sealant skin.

6. Toolset according to claim 1, wherein at least some of the mandrel elements are revolving parts mounted on a bearing axle of the mandrel.

7. Toolset according to claim 1, wherein at least some of the mandrel elements are mounted on receiving tubes of a bearing axle of the mandrel.

8. Method for producing an object comprising a metal liner, comprising:
placing metal portions of a metal liner on mandrel elements;
assembling elements of the mandrel bearing the portions of the metal liner; and
welding metal portions of the metal liner onto the assembled mandrel elements; and
positioning annular sectors on junction ends of said mandrel elements before placing the metal liner portions on the mandrel elements.

9. Method according to claim 8, wherein the object is a composite vessel, the method comprising winding fibers on the liner assembled on the elements of the mandrel.

10. Method according to claim 8, wherein assembling elements of the mandrel is realized on a rotating drive axle of the mandrel.

11. Method according to claim 9, wherein, the mandrel comprises a soluble mandrel, and the method comprises reabsorbing the mandrel after either the welding or the winding.

12. Method according to claim 8, wherein welding portions of the liner assembled on the elements of the mandrel is realized by welding edges facing portions of the liner above channels at the annular sectors.

13. Method according to claim 8, wherein placing said portions comprises:
heating the liner portions;
positioning the liner portions on the mandrel elements; and
cooling the liner portions producing a shrink-fitting of the liner portions on the mandrel elements.

14. Method according to claim 8, wherein the object is a composite vessel with the metal liner, and wherein the mandrel elements are shaped into a front body and a rear body.

15. Method according to claim 8, wherein the object is a composite vessel with a metal liner, and wherein the mandrel elements are shaped into a front body and, rear body and at least one intermediate cylindrical body.

16. Toolset for manufacturing a metal liner for a composite vessel, comprising a mandrel configured in several mandrel elements forming support elements of primary parts constituting the metal liner, wherein, the metal liner comprising a cylindrical vessel liner with rounded ends, the support elements comprise a front body, a rear body and at least one intermediate cylindrical body to receive respectively a first rounded metal liner end, a second rounded metal liner end and at least one cylindrical metal liner intermediate part, said toolset comprising further annular sectors designed to be positioned on junction ends of said front body, rear body and intermediate cylindrical body to support junction ends of said first rounded metal liner end, a second rounded metal liner end and at least one cylindrical metal liner intermediate part wherein the mandrel elements are parts made of a soluble material.

17. Toolset according to claim 16, wherein, said annular sectors are sectors made of steel.

18. Toolset according to claim 16, wherein the annular sectors comprise a peripheral annular setback designed to form an annular channel with a peripheral annular setback of an adjacent sector.

19. Toolset according to claim 16, wherein the annular sectors are removable sectors.

20. Toolset according to claim 16, wherein the parts made of a soluble material are wrapped in a sealant skin.

21. Toolset according to claim 16, wherein at least some of the mandrel elements are revolving parts mounted on a bearing axle of the mandrel.

22. Toolset according to claim 16, wherein at least some of the mandrel elements are mounted on receiving tubes of a bearing axle of the mandrel.

* * * * *